United States Patent
Mendiola et al.

(10) Patent No.: US 8,244,285 B2
(45) Date of Patent: Aug. 14, 2012

(54) BUDDY-BASED CROSS-CARRIER MESSAGING SYSTEM

(75) Inventors: Dennis Mendiola, New York, NY (US); Chito Bustamante, Pasig (PH)

(73) Assignee: Chikka Pte. Ltd., Singapore (SG)

( * ) Notice: Subject to any disclaimer, the term of this patent is extended or adjusted under 35 U.S.C. 154(b) by 963 days.

(21) Appl. No.: 12/092,969

(22) PCT Filed: Nov. 3, 2006

(86) PCT No.: PCT/SG2006/000331
§ 371 (c)(1),
(2), (4) Date: May 7, 2008

(87) PCT Pub. No.: WO2007/053122
PCT Pub. Date: May 10, 2007

(65) Prior Publication Data
US 2009/0017847 A1    Jan. 15, 2009

(30) Foreign Application Priority Data
Nov. 7, 2005  (SG) ............... 200508507-1

(51) Int. Cl.
*H04W 4/00* (2009.01)
*H04M 11/00* (2006.01)

(52) U.S. Cl. .......... 455/466; 379/93.24; 379/93.25; 455/414.1

(58) Field of Classification Search ......... 455/406, 455/408, 414.1, 415, 466; 709/206; 379/93.01, 379/93.02, 93.03, 93.04, 93.23, 93.25, 93.26, 379/93.31, 93.32, 142.01, 142.04, 142.06, 379/201.07, 201.1, 201.12, 221.08, 221.09, 379/221.1, 365
See application file for complete search history.

(56) References Cited

U.S. PATENT DOCUMENTS

| | | | | |
|---|---|---|---|---|
| 6,977,996 | B1 * | 12/2005 | Brothers et al. | 379/114.05 |
| 7,039,390 | B1 * | 5/2006 | Hohne et al. | 455/406 |
| 7,496,379 | B2 * | 2/2009 | Kaplan et al. | 455/557 |
| 7,640,293 | B2 * | 12/2009 | Wilson et al. | 709/203 |
| 2002/0112014 | A1 * | 8/2002 | Bennett et al. | 709/206 |
| 2004/0137899 | A1 * | 7/2004 | Hartmaier | 455/432.2 |

FOREIGN PATENT DOCUMENTS

WO    WO 0069140 A1 * 11/2000

OTHER PUBLICATIONS

WIPO, International Search Report for International Application No. PCT/PCT/SG2006/000331.

* cited by examiner

*Primary Examiner* — Vladimir Magloire
*Assistant Examiner* — Michael S Bush
(74) *Attorney, Agent, or Firm* — Intellectual Property Law Group LLP

(57) ABSTRACT

A buddy-based, cross-carrier mobile phone based text messaging server, system and method is disclosed. A table of subscribers cross referenced against buddy subscribers who have opted in to receive text messages (SMS) is maintained. Where a recipient subscriber is not yet registered as a buddy subscriber, the server sends a message asking if the recipient subscriber wants to become a buddy subscriber of the sending subscriber. If the recipient subscriber opts-in, the recipient subscriber is added to the table as a buddy subscriber, and thereafter will be forwarded all messages through the service, sent from the particular sending subscriber, until the buddy subscriber opts-out. The invention ensures a near one to one correspondence of in/out SMS for participating mobile phone networks, and avoids any one network being overloaded with spam messaging.

13 Claims, No Drawings

BUDDY-BASED CROSS-CARRIER MESSAGING SYSTEM

FIELD OF THE INVENTION

This invention relates to the field of subscriber-based personal telecommunications technology, and in particular to mobile phone or cell phone technology, and a system and method for providing cross-carrier messaging.

BACKGROUND ART

Mobile phone or cell phone technology has become widely accepted by consumers throughout the world. The short message service (SMS) facility, often referred to by consumers as "texting" has in recent years also become popular, allowing subscribers to exchange messages at rates that are usually below the rate for voice communication, and allowing subscribers to receive messages without the need to dial a service to retrieve them.

Mobile phone or cell phone services are operated by telecommunications companies with subscribers gaining access to the network of a telecommunications company, either on a contract basis through which credit is extended, or on a pre-paid plan. There is usually more than one mobile network operator providing services to subscribers in any jurisdiction, and there are many mobile network operators throughout the world.

To enable subscribers of different mobile networks to communicate by SMS, the mobile network operators have reached various agreements with respect to the levying of charges. In the industry, an agreement between two mobile network operators in the same country to interconnect their respective SMS networks, for the purpose of facilitating SMS exchange between their mobile subscribers, is generally referred to as operators' inter-operator SMS (IOSMS), or inter-working SMS. Where the agreement is between mobile network operators in different countries, this is referred to as international SMS (ISMS).

Subscriber charging is either mobile originating (MO) charging, where the subscriber who sends the message is charged/billed upon sending the message, or mobile terminating (MT) charging, otherwise known as reverse billing, where the mobile subscriber receiving the message is charged upon receipt of a message.

In IOSMS, the usual revenue scheme is "sender-keep-all", where the mobile network operator of the calling/sending subscriber keeps all of the revenue (generated from an MO message). With this arrangement, the originating mobile network operator does not share the revenue with the terminating/receiving mobile network operator. In local IOSMS in most countries, the majority of mobile network operators operate in a sender-keep-all fashion.

International SMS between operators in most countries also operate in a sender-keep-all scheme, but with exceptions. Some (receiving) operators have required MT charging; that is, charge the sending operator a particular tariff for terminating a message onto their network. ISMS MT charging is largely a measure which has been adopted to prevent or discourage unsolicited messaging or spam and also as a means of allowing operators to earn more in situations wherein there is a significant imbalance between messages received unto and sent from an operator.

The sender-keep-all system was adopted in the nascent years of text messaging since it was simple, straightforward, and text messaging (then) was not considered a significant revenue driver. But as the service matured and became more and more a part of people's lives, text messaging became an important part of a mobile network operator's service offering and consequently an important sales driver.

Text messaging between subscribers typically followed a one-to-one/tit-for-tat messaging pattern, in which subscriber A texts subscriber B, and then subscriber B replies to subscriber A. In IOSMS, this pattern has served to reinforce a sender-keep-all revenue regime, as each mobile network operator had an opportunity to earn revenue from the transactions. As text messaging matured, the situation began to change. New entrant mobile network operators began offering more aggressive pricing, options on their services. In IOSMS and ISMS, the messaging imbalance resulting from the difference in inbound (to a mobile network operator) text messaging volume compared with outbound (from that mobile network operator) became more acute. This was due to several factors, including the difference in mobile network operator pricing, disparity of purchasing power of mobile network subscribers across different countries, and in general, people's natural inclination to engage in text-based communication. For example, ISMS for US-based Filipino subscribers is relatively more affordable than it is for their compatriot Philippine-based subscribers. Consequently, message inbound traffic from the U.S. is multiple times more than message outbound from the Philippines to the U.S.

Due to this growing imbalance plus a desire to earn more from text traffic, certain mobile network operators, mostly those in the U.S. and in Europe, began to impose termination charges billed against their mobile network operator partners for messages received on their system. This prompted partner mobile network operators likewise to start imposing termination charges themselves.

Further, smaller operators and those from countries with lower disposable income likewise realized that to be able to partake in the revenues coming from higher tariff operators would actually boost their total revenues from ISMS.

More recently, some mobile network operators began offering an intra-network operator, unlimited text messaging plan, whereby subscribers can send unlimited text messages (presumably for a flat fee) to other subscribers within the same network. Such schemes have been quite successful in increasing overall ARPU (average revenue per user—per month) for the operators.

It would be ideal if mobile network operators could implement unlimited IOSMS and ISMS plans for a flat fee, pre-paid or as part of their monthly plan—thereby increasing the overall attractiveness of the mobile service to their subscribers; however, several practical difficulties have prevented this from being implemented. The primary obstacle to this is the imbalance in messaging volume between mobile network operators in different countries, and also in the same country, where some operators have launched aggressively priced services.

One problem with unlimited ISMS/IOSMS is spam or indiscriminate messaging originating from a subscriber of one mobile network operator; for example, a malicious subscriber from mobile network operator A, taking advantage of favourable rates of mobile network operator A, may spam the subscribers of mobile network operator B. Mobile network operator B has no direct control over the spammer because he is a subscriber of mobile network operator A, and worse, operator B likely derives zero revenues from subscriber A's messaging. In a sender-keep-all regime, the receiving mobile network operators may complain that they are not earning from the incoming text, that these ISMS/IOSMS messages are contributing to network congestion, and worse, may be annoying their subscribers. Further, in an IOSMS setting, the mobile network operators with the larger market shares would naturally avoid arrangements with a mobile network operators offering unlimited ISMS/IOSMS, since in reaching an arrangement they would in effect be permitting their competitors to under-price them using their own subscriber base.

Further, should operator B decide to impose termination charges billed to operator A, unlimited text messaging plans would become financially unviable for operator A or its ISMS IOSMS third party provider. Operator A may likely find themselves in a situation whereby they are paying operator B more for the incremental ARPU derived from the subscribers of operator A opting in for the unlimited plan.

In the U.S., most if not all mobile network operators, in particular, do not allow third parties (such as value-added service providers or content providers) to charge their subscribers for premium message terminating traffic without the receiving person first agreeing to such charges. (Such premium messaging services include PC-to-mobile messaging services offered by established Internet companies like Yahoo! and AOL, and in the case of the Philippines, Chikka's PC-Based text messaging service.)

This invention seeks to provide a system and method for IOSMS and/or ISMS that will overcome or ameliorate some of these problems associated with unlimited text-messaging services or (relatively) aggressive text messaging plans.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

These and other problems are overcome by providing an arrangement where recipient subscribers can opt in to receive SMS/text messages from sending subscribers. In a preferred implementation, this is by the sending mobile network service using an access code or shortcode as a means of delivering messages as opposed to using direct person-to-person SMS format.

In accordance with one aspect of the invention there is provided a server for implementing a mobile phone based text messaging service, said server being arranged to be associated with a mobile phone network, said server having a memory containing a table of predetermined subscribers, said table arranged to associate telecommunications identifiers of buddy subscribers of at least one other mobile phone network against said predetermined subscribers;

said server being arranged to receive a first communication including a text message from a predetermined subscriber of said mobile phone network operator, said text message being intended for another subscriber of another mobile phone network, said first communication including a telecommunications identifier for said another subscriber;

where said server checks to determine if said another subscriber is a buddy subscriber associated with said predetermined subscriber;

and if not, sends a second communication to said telecommunications identifier, said second communication informing said another subscriber of the existence of the first communication, and inviting said another subscriber to opt-in to become a buddy subscriber indexed against said predetermined subscriber and to receive this and future messages from said predetermined subscriber;

where if said another subscriber opts-in, said server records said another subscriber as buddy subscriber of said predetermined subscriber, recording in said table said another subscriber details including at least said telecommunications identifier against said predetermined subscriber in said table, and sends said text message from said predetermined subscriber to said another subscriber;

and if so, said server sends said text message to said another subscriber.

Preferably said server is associated with a shortcode address accessible by subscribers of said mobile phone network, through which said first communication is sent.

The server provides functionality additional to SMSC associated with a mobile network. It should be appreciated that the server can be incorporated into an SMSC server, the SMSC server having its own shortcode for normal SMS functionality.

Preferably said server is associated with a billing module to bill service charges associated with each SMS/text message from said predetermined subscriber to said another subscriber, preferably care of said another mobile phone network, where said another subscriber has opted-in to become a buddy subscriber indexed against said predetermined subscriber.

Preferably, once said another subscriber has opted-in to become a buddy subscriber indexed against said predetermined subscriber, said server communicates with said billing module to apply an appropriate fee for this service, Preferably said server is arranged to first check the identity of the subscriber sending of said text message against said table, before proceeding to communicate with said another subscriber. Preferably if the predetermined subscriber is not present in said table of predetermined subscribers, said server includes a subroutine arranged to send a service-refused message to said subscriber. Alternatively if the subscriber is not present in said table of predetermined subscribers, said server includes a subroutine to add the subscriber as a predetermined subscriber.

Preferably said second communication includes a part of said text message.

Preferably said server is arranged to periodically send an opt out message to said another subscriber.

Alternatively said server is arranged to send every text message with an opt-out invitation to said another subscriber.

Preferably said server arranges any or all of the messages to said another subscriber, to ensure replies are routed back to said server.

In one implementation the text messaging service may be routed via a shortcode with a said another mobile phone network, however in alternate implementations, a said another mobile phone network may require replies to be routed through their normal ISMS channels. In the former case, the "sender" of the message to said another subscriber will be in typical format +639175555555 as opposed to the shortcode+mobile number format, e.g., 222639175555555.

Where the buddy subscribers are accessed via a shortcode of a said another mobile phone network, this would prove particularly useful where said mobile phone network and said another mobile phone network both enter into an arrangement regarding provision of the buddy-based cross-carrier messaging services.

Also in accordance with the invention there is provided a buddy-based cross-carrier messaging system comprising a server application for implementing a mobile phone based text messaging service, said server application being associated with a mobile phone network, said server application having a table of predetermined subscribers, said table arranged to associate telecommunications identifiers of buddy subscribers of at least one other mobile phone network against said predetermined subscribers;

said server application being arranged to receive and process a first communication including a text message from a predetermined subscriber of said mobile phone network operator, said text message being intended for another subscriber of another mobile phone network, said first communication including a telecommunications identifier for said another subscriber;

where said server application checks said table to determine if said another subscriber is a buddy subscriber associated with said predetermined subscriber;

and if not, sends a second communication to said telecommunications identifier, said second communication informing said another subscriber of the existence of the first communication, and inviting said another subscriber to opt-in to become a buddy subscriber indexed against said predetermined subscriber and to receive this and future messages from said predetermined subscriber;

where if said another subscriber opts-in, said server application records said another subscriber in said table as buddy subscriber of said predetermined subscriber, recording in said table said another subscriber details including at least said telecommunications identifier against said predetermined subscriber in said table, and sends said text message from said predetermined subscriber to said another subscriber;

and if so, said server application sends said text message to said another subscriber.

Preferably, said server application is associated with a shortcode address accessible by subscribers of said mobile phone network.

Preferably said server application is associated with a billing module to bill service charges associated with each SMS/text message from said predetermined subscriber to said another subscriber, preferably care of said another mobile phone network, where said another subscriber has opted-in to become a buddy subscriber indexed against said predetermined subscriber. Alternatively the billing module may bill service charges in the form of a flat fee, charged for an unlimited number of messages over a predetermined period of time.

Preferably, once said another subscriber has opted-in to become a buddy subscriber indexed against said predetermined subscriber, said server application communicates with said billing module to apply an appropriate fee for this service, Preferably said server application is arranged to first check the identity of the subscriber sending of said text message against said table, before proceeding to communicate with said another subscriber. Preferably if the predetermined subscriber is not present in said table of predetermined subscribers, said server application includes a subroutine arranged to send a service-refused message to said subscriber. Alternatively if the subscriber is not present in said table of predetermined subscribers, said server application includes a subroutine to add the subscriber as a predetermined subscriber.

Preferably said second communication includes a part of said text message.

Preferably said server application is arranged to periodically send an opt out message to said another subscriber.

Alternatively said server application is arranged to send every text message with an opt-out invitation to said another subscriber.

Preferably said server application arranges any or all of the messages to said another subscriber, to ensure replies are routed back to said server.

Further, in accordance with the invention there is provided a method for implementing a buddy-based cross-carrier mobile phone based text messaging service, said method including steps of providing a server application associated with a mobile phone network, said server application having a table of predetermined subscribers, said table arranged to associate telecommunications identifiers of buddy subscribers of at least one other mobile phone network against said predetermined subscribers;

where when said server application receives a first communication including a text message from a predetermined subscriber of said mobile phone network operator, said text message being intended for another subscriber of another mobile phone network, said first communication including a telecommunications identifier for said another subscriber, said server application checks said table to determine if said another subscriber is a buddy subscriber associated with said predetermined subscriber;

and if not, sends a second communication to said telecommunications identifier, said second communication informing said another subscriber of the existence of the first communication, and inviting said another subscriber to opt-in to become a buddy subscriber indexed against said predetermined subscriber and to receive this and future messages from said predetermined subscriber;

where if said another subscriber opts-in, said server application records said another subscriber in said table as buddy subscriber of said predetermined subscriber, recording in said table said another subscriber details including at least said telecommunications identifier against said predetermined subscriber in said table, and sends said text message from said predetermined subscriber to said another subscriber;

and if so, said server application sends said text message to said another subscriber.

Preferably, said server application is associated with a shortcode address accessible by subscribers of said mobile phone network.

Preferably said server application is associated with a billing module to bill service charges associated with each SMS/text message from said predetermined subscriber to said another subscriber, preferably care of said another mobile phone network, where said another subscriber has opted-in to become a buddy subscriber indexed against said predetermined subscriber.

Preferably, once said another subscriber has opted-in to become a buddy subscriber indexed against said predetermined subscriber, said server application communicates with said billing module to apply an appropriate fee for this service, Preferably said server application is arranged to first check the identity of the subscriber sending of said text message against said table, before proceeding to communicate with said another subscriber. Preferably if the predetermined subscriber is not present in said table of predetermined subscribers, said server application includes a subroutine arranged to send a service-refused message to said subscriber. Alternatively if the subscriber is not present in said table of predetermined subscribers, said server application includes a subroutine to add the subscriber as a predetermined subscriber.

Preferably said second communication includes a part of said text message.

Preferably said server application is arranged to periodically send an opt out message to said another subscriber.

Alternatively said server application is arranged to send every text message with an opt-out invitation to said another subscriber.

Preferably said server application arranges any or all of the messages to said another subscriber, to ensure replies are routed back to said server.

BEST MODE(S) FOR CARRYING OUT THE INVENTION

A preferred embodiment of the invention will now be described in the following description of a server incorporating a buddy-based cross-carrier messaging system, and methodology, and describing its interconnection with a mobile phone network.

The object of this invention is to enable mobile phone networks (telcos) to offer unlimited or ultra-aggressive inter-operator and international text messaging plans. This should be possible if one or both of the following conditions are met:
1) inter-operator messaging traffic balance is preserved, and
2) the recipient can be charged enough to offset the termination charges levied on the sending telco by the receiving telco.

The sending telco achieves this by providing a shortcode service for its subscribers who desire to enter a plan where they may avail themselves on unlimited SMS to subscribers of another telco. The subscribers availing themselves on this service may either register beforehand, or a registration routine may be provided through a server associated with the shortcode, where the subscriber is prompted through the registration process. Registration may take place by the subscriber acknowledging acceptance of the terms and conditions of the service (perhaps by a text message "yes"). The service may be provided in the form of a flat fee for unlimited IOSMS or SMS over a predetermined period of time, or by acceptance of charges applied by the receiving telco.

The server is associated with the mobile phone network and has a shortcode address accessible by subscribers of the mobile phone network. The shortcode address is an easy to remember number that registered subscribers prefix to the number they are intending to send a SMS to.

The server has a memory containing a table of registered subscribers and their particulars such as mobile phone number, or alternatively an index to this data in a server of the telco. The table also indexes (cross references) telecommunications identifiers in the form of telephone numbers including country codes and other prefixes (if any) of buddy subscribers of other mobile phone networks against each registered subscribers. These buddy subscribers of other mobile phone networks are subscribers who have agreed to payment of a fixed fee for service, and/or meet the terminating charges for incoming SMS from the particular registered subscriber, where levied by the terminating telco (the telco of the buddy subscriber).

Prior to registration of a particular buddy subscriber, the registered subscriber will contact the potential buddy subscriber via the shortcode. Assuming that the shortcode to access this service is 99, and the intended buddy subscriber is located in Australia and has mobile number (0) 419 111 111, the registered subscriber will send a first communication in the form of a SMS message (a text) to 99 61 419 111 111 (note that 61 is the IDD code for Australia). This will be received and processed by the server in the following manner. From the suffix to the shortcode 99, the server will check to see if the intended buddy subscriber phone number 61 419 111 111 is stored in the table, cross referenced to the registered subscriber. If not, the short code server will store the intended buddy subscriber phone number in the table, alongside a flag which is set to 0 (zero), along with the SMS sent by the registered subscriber, and a cross reference to the registered subscriber, or alternatively against the registered subscriber. A timer is initialised and runs for a predetermined period, within which the intended buddy would be expected to respond. A period of 72 hours should prove suitable.

The SMS server composes an invitation SMS message to the intended buddy subscriber, having the following content:
"YOUR FRIEND WITH MOBILE NUMBER 63 9175555555 FROM THE PHILIPPINES WISHES TO TEXT WITH YOU. TO READ YOUR FRIEND'S MESSAGES, PLEASE REPLY WITH YES."

If at the end of the predetermined period, the intended buddy has not responded the server can take steps to remove details associated with the intended subscriber, including sending a message to the registered subscriber asking if the registered subscriber requires the time to be extended, or informing that the message must be resent.

On receipt, the intended buddy subscriber can opt-in to receive this message by replying YES. This reply is received by the server, and the flag alongside the intended buddy subscriber phone number in the table is set to 1, and the original SMS from the registered subscriber is sent to the buddy subscriber via their mobile phone number.

The buddy subscriber can reply to the SMS from the registered subscriber, which reply will be routed through the server, and then sent by the server to the registered subscriber.

Where the registered subscriber sends a subsequent message to the buddy subscriber, the subsequent message should be sent via the shortcode, as the server checks the table to determine if the buddy subscriber is cross-referenced with the registered subscriber. If the flag is set to zero, the server reinitialises the timer (at 72 hours), and reissues the invitation SMS message to the intended buddy subscriber. In an alternative arrangement, the server may be set to refuse further action until the intended buddy subscriber has accepted, or alternatively, may inform the registered subscriber that the message has not been forwarded since the intended buddy subscriber has not accepted. These actions may be desirable where the originating mobile network might be liable for charges from the terminating mobile network.

If the flag is set to 1, the server will send the SMS text message from the registered subscriber to the buddy subscriber. From time to time, the SMS text message will also include an opt-out message tagged onto the end. The opt-out message can read:
"TO STOP RECEIVING MESSAGES FROM YOUR FRIEND WITH MOBILE NUMBER . . . PLEASE REPLY WITH BLOCK".

The buddy subscriber can reply to the SMS from the registered subscriber, which reply will be routed through the server, and then sent by the server to the registered subscriber. However, if the buddy subscriber replies with "BLOCK" the server will detect this, and delete the buddy subscriber cross reference to the registered subscriber, and all relevant data to this cross reference.

Otherwise, the buddy subscriber can reply to the SMS text message in the normal manner, as described above, and the server will forward the reply message to the registered subscriber. The way by which the buddy subscriber replies are sent may be through the regular isms format—i.e. +60419111111—or via a shortcode provided by the receiving (buddy subscriber) telco—i.e., 55560419111111.)

The server is associated with a billing module of an accounting server of the mobile phone network, or where this service is being provided by an external provider to the mobile phone network with a billing module of an accounting server of the external provider. Once a subscriber of another mobile phone network has become a buddy subscriber, the billing module tracks terminating charges applied by the buddy subscriber telco and billed to the sender telco IOSMS provider), and issues charges against the buddy subscriber via the buddy subscriber telco, in the normal manner that such inter-telco charges are billed. Depending upon the arrangement entered into between the mobile phone networks and any third party service provider, it is possible that the receiving telco will choose not to charge the third party provider or sender telco, in keeping with a sender keep all system. Similarly, the buddy subscriber is not necessarily charged, but the third party IOSMS provider or the sending telco may be charged, depending upon arrangements between the telcos and any third party provider.

While this invention has been described where the sending subscriber suffixes the buddy subscriber phone number to the shortcode, in an alternative implementation the subscriber of the mobile network can send an SMS to the mobile phone network with the following format in message body of text: "<mobile phone number of party b> <actual message>.

The invention has a number of advantages over other attempts to provide for unlimited SMS or otherwise, aggressively priced SMS plans. Spamming is almost impossible in the system according to the invention, due to the opt-in nature of the service. Party B must first agree to receive text messages from Party A, especially in cases where Party B pays for receiving text messages. In the event that Party B no longer wants to receive text messages from Party A, Party B can opt-out. Any subscriber of a telco implementing the invention who seeks to use the invention as a vehicle for spamming, will quickly find that the buddy subscribers will opt out or that potential buddy subscribers may choose not to opt-in to receive messages in the first place; thus any fears that the buddy subscriber's telco might have regarding network congestion will prove unfounded. Because there is likely to be a one-to-one correspondence between Party A and Party B, it is expected that there will be a near one-to-one text incoming and outgoing ratio as well, or at the very least a ratio much better than would have been achieved under a no-buddy system, with one telco having an unlimited plan. This will preserve the income for the buddy subscriber's telco, as the buddy subscriber's telco will make money from the replies of the buddy subscriber. Further, in the case, wherein the buddy telco agrees to charge the buddy subscriber for messages received, then the buddy telco stands to earn from this traffic, as well.

The implementation of the invention allows the implementing telco to offer unlimited or aggressively priced IOSMS and/or ISMS to its subscribers either for a flat charge per buddy and/or per pre-defined period of time which would be calculated in such a way that the implementing telco foresees an overall increase in ARPU for these types of subscribers. The actual flat charge will be determined through a variety of factors, including a subscriber's current IOSMS usage and how this will be affected by various flat fee price points for unlimited. As part of the analysis, one would also need to factor the terminating telco's charges back to the subscriber's telco or third party IOSMS provider, or for a charge levied on the terminating subscriber, where the terminating subscriber opts in and the terminating telco levies a charge on the sending telco or third party provider, revenue share emanating from such terminating messages on reverse billing, and revenue share coming from the replies of the terminating subscriber to such messages. Ideally, the charges levied the implementing telco is offset by the revenue share from the reverse billing charges made towards the buddy subscribers. This way the flat fee is a pure profit made of the implementing telco's subscribers with no corresponding net outlay paid the terminating telco.

It should be appreciated that the scope of this invention is not limited to the particular embodiment described herein. The skilled addressee will appreciate that minor changes are possible without departing from the spirit and scope of the invention.

The claims defining in the invention are as follows:

1. A method for implementing a mobile phone network based text messaging service comprising the steps of:
    receiving a first communication message including a text message from a first communication device possessed by a sender subscriber by way of a first mobile phone network, the text message identifying the intended recipient as a second communication device;
    checking whether at least a telecommunications identifier of the second communication device is included on a list of communication devices associated with the first communication device, wherein the list is determined and maintained by the messaging service to record associations of the sender subscriber;
    if so included, sending the text message to the second communication device by way of a second mobile phone network;
    if not so included:
        sending a second communication message to the second communication device by way of the second mobile phone network informing the second communication device of the existence of the text message;
        seeking authorisation from a possessor of the second communication device to associate the second communication device with the first communication device;
        and if such authorisation is given:
            including the second communication device on the list of communication devices associated with the first communication device; and
            sending the text message to the second communication device by way of the second mobile phone network.

2. A method for implementing a mobile phone network based text messaging service according to claim 1, further including the step of inserting an extract of the text message from the first communication message in the second communication message.

3. A method for implementing a mobile phone network based text messaging service according to claim 1 or claim 2, further including the steps of:
    appending an opt-out invitation to the text message sent to the second communication device;
    and, if the invitation is accepted:
        disassociating the second communication device from the first communication device; and
        removing the second communication device from the list of communication devices associated with the first communication device.

4. A method for implementing a mobile phone network based text messaging service according to claim 1, further including the step of configuring the text message sent to the second communication device so that replies made thereto are sent direct to the first communication device.

5. A mobile phone network based text messaging service system comprising:
- a server;
- a first communication device communicable with the server through a first mobile phone network, possessed by a sender subscriber of the first mobile phone network; and
- a second communication device communicable with the server through a second mobile phone network where, when the server receives a first communication message including a text message from the first communication device, the text message identifying the intended recipient as the second communication device, the server checks whether at least a telecommunications identifier of the second communication device is included on a list of communication devices associated with the first communication device, wherein the list is determined and maintained by the messaging service to record associations of the sender subscriber;

and, if so included, sends the text message to the second communication device;

and, if not so included, sends a second communication message to the second communication device informing the second communication device of the existence of the text message and seeking authorisation from a possessor of the second communication device to associate the second communication device with the first communication device and, if such authorisation is given, to include the second communication device on the list of communication devices associated with the first communication device and thereafter send the text message to the second communication device.

6. A mobile phone network based text messaging service system according to claim 5, where the first communication message is sent to an access code address operated by the server.

7. A mobile phone network based text messaging service system according to claim 5 or claim 6, where the second communication message includes an extract of the text message from the first communication message.

8. A mobile phone network based text messaging service system according to claim 5, where the server is further operable to append an opt-out invitation to text messages sent to the second communication device and, if the invitation is accepted, the server disassociates the second communication device from the first communication device and removes the second communication device from the list of communication devices associated with the first communication device.

9. A mobile phone network based text messaging service system according to claim 5, where the server configures the text message that is sent to the second communication device in such a manner that replies made to the text message are sent direct to the first communication device.

10. A non-transitory computer readable medium having software recorded thereon, the software comprising:
- incoming communication means for receiving a first communication message including a text message from a first communication device by way of a first mobile phone network, the first communication device possessed by a sender subscriber of the first mobile phone network, the text message identifying the intended recipient as a second communication device;
- verification means for checking whether at least a telecommunications identifier of the second communication device is included on a list of communication devices associated with the first communication device, wherein the list is determined and maintained to record associations of the sender subscriber;
- authorised communication means for sending the text message to the second communication device by way of a second mobile phone network if at least the telecommunications identifier of the second communication device is so included;
- outgoing communication means for sending a second communication message to the second communication device by way of the second mobile phone network informing the second communication device of the existence of the text message, the second communication message seeking authorisation from a possessor of the second communication device to associate the second communication device with the first communication device;
- association means for including the second communication device on the list of communication devices associated with the first communication device if the possessor provides such authorisation; and
- initial communication means for sending the text message to the second communication device by way of the second mobile phone network if authorisation is so provided by the possessor.

11. A non-transitory computer readable medium having software recorded thereon according to claim 10, where the authorised communication means is further operable to insert an extract of the text message from the first communication message in the second communication message.

12. A non-transitory computer readable medium having software recorded thereon according to claim 10 or claim 11, further comprising:
- authorised communication means for appending an opt-out invitation to the text message sent to the second communication device; and
- disassociation means for disassociating the second communication device from the first communication device and removing the second communication device from the list of communication devices associated with the first communication device, if the opt-out invitation is accepted.

13. A non-transitory computer readable medium having software recorded thereon according to claim 10, where the authorised communication means and/or the initial communication means is further operable to configure the text message sent to the second communication device so that replies made thereto are sent direct to the first communication device.

* * * * *